United States Patent [19]

Tajima et al.

[11] Patent Number: 5,459,622
[45] Date of Patent: Oct. 17, 1995

[54] DEVICE FOR CONTROLLING THE ROTATION OF THE HEAD DRUM

[75] Inventors: Koji Tajima, Tokyo; Tetsuya Wakui, Chiba, both of Japan

[73] Assignee: Canon Kabushiki Kaisha, Tokyo, Japan

[21] Appl. No.: 908,444

[22] Filed: Jun. 30, 1992

Related U.S. Application Data

[63] Continuation of Ser. No. 392,361, Aug. 10, 1989, abandoned.

[30] Foreign Application Priority Data

Aug. 30, 1988 [JP] Japan .................................. 63-217211

[51] Int. Cl.$^6$ ................................................. G11B 21/04
[52] U.S. Cl. ....................... 360/70; 360/10.3; 360/73.05; 360/73.08
[58] Field of Search ......................... 360/10.3, 70, 77.12, 360/77.13, 10.1, 73.05, 73.06, 73.07, 73.08, 73.11, 73.12, 73.13

[56] References Cited

U.S. PATENT DOCUMENTS

| | | | |
|---|---|---|---|
| 4,268,873 | 5/1981 | Kobori et al. | 360/70 X |
| 4,463,390 | 7/1984 | Koga et al. | 360/10.3 |
| 4,568,986 | 2/1986 | Furuhara et al. | 360/10.3 |
| 4,679,098 | 7/1987 | Williams et al. | 360/10.1 |
| 4,680,648 | 7/1987 | Takayama | 360/70 |
| 4,764,824 | 8/1988 | Tani et al. | 360/70 |
| 4,796,104 | 1/1989 | Ito et al. | 360/10.3 |
| 4,817,887 | 4/1989 | Harigaya et al. | 360/73.05 X |
| 4,930,024 | 5/1990 | Kanda et al. | 360/10.3 |
| 4,954,902 | 9/1990 | Furuhata et al. | 360/77.12 |
| 4,985,786 | 1/1991 | Arai et al. | 360/70 |

OTHER PUBLICATIONS

"Magnetic Tape" by Ampex Corporation Bulletin No. 9, Mar. 1965, 7 pages.

*Primary Examiner*—Andrew L. Sniezek
*Assistant Examiner*—Varsha A. Kapadia
*Attorney, Agent, or Firm*—Robin, Blecker, Daley and Driscoll

[57] ABSTRACT

A rotation control device including a rotary head drum drive circuit for driving rotation of a rotary head drum, a tape transport mechanism for transporting a tape in a predetermined direction relative to the rotary head drum, and a correction circuit for detecting a change of the speed of transportation of the tape to supply correction information to the rotary head drum drive circuit so that the driving state of the rotary head drum is corrected.

30 Claims, 6 Drawing Sheets

DEVICE FOR CONTROLLING THE ROTATION OF THE HEAD DRUM

This is a continuation application under 37 CFR 1.62 of prior application Ser. No. 392,361, filed Aug. 10, 1989, now abandoned.

BACKGROUND OF THE INVENTION

1. Field of the Invention

This invention relates to a rotation control device suited to be used in video tape recorders or the like.

2. Description of the Related Art

In recent years, the development of imaging instruments, such as video tape recorders (hereinafter abbreviated to VTR), is remarkable. Taking for example the VTR, besides the normal recording and reproduction modes, it is possible to choose a high speed search mode, still reproduction mode, slow reproduction mode, etc., where the tape runs with selection of a plurality of different speeds from the normal one for reproduction.

In the high speed search mode, for example, because the tape speed is far faster than in the normal reproduction, if the speed of rotation of the rotary head drum remains the same as in the normal reproduction, a discrepancy arises between the speeds of the head and the record track on the tape. And, this discrepancy causes shift of the frequency of the reproduced signal with the result of a chromatic deviation, and shift of the horizontal synchronizing frequency being reproduced, which tends to have the horizontal synchronism in the television receiver, or monitor display put out of order.

To solve these problems, measure is taken to correct the rotational frequency of the rotary head drum so that the speed of the head on the rotating drum and the record track on the running tape coincide with each other.

FIG. 1 is a block diagram of a drive control circuit for the rotary head drum and the capstan in, for example, the 8 mm VTR.

In the figure, a system control circuit 1 for controlling all the coordinations of the system is constructed with a CPU, a ROM having control programs stored therein, a RAM for memorizing every item of control information, etc. An electric motor 2 rotates a rotary head drum. From the motor 2 for rotating the drum, or from the rotary head drum, a PG pulse generator 3 detects its phase of rotation. An FG pulse generator 4 produces a pulse signal representing the speed of rotation of the motor 2 for rotating the drum. The PG pulse produced by the PG pulse generator 3 is supplied to a phase comparator circuit 6 where it is compared in phase with a reference signal (the vertical synchronizing signal Vsync produced by a synchronous separation circuit 12 to be described later, or the output $ref_1$ of a frequency divider 13) to produce a phase error signal. The FG pulse produced by the FG pulse generator 4 is supplied through an amplifier 7 to a speed comparator circuit 8 where it is subjected to frequency-to-voltage conversion to produce a speed error signal. The phase error signal and speed error signal are added by an adder 9 and then fed back through an amplifier 10 to a drive circuit 11 for driving the motor 2 for rotating the drum. Thus, a speed servo and a phase servo are operated so as to always maintain constant the speed and phase of rotation of the motor 2 for rotating the drum.

The synchronous separation circuit 12 separates the vertical synchronizing signal Vsync from the video signal. The frequency divider 13 divides the frequency of a standard signal from a crystal oscillator (not shown) or the like into a predetermined value (for example, the vertical synchronizing frequency) to produce a reference signal $ref_1$ which is supplied to the phase comparator circuit 6. A switch $S_1$ moves in response to selective setting of the recording and reproduction modes. Switching is operating in such a manner that during recording, the vertical synchronizing signal of the inputted video signal is supplied to the phase comparator circuit 6, while during reproducing, the reference signal output from the frequency divider 13 is supplied to the phase comparator circuit 6.

When the speed of transport of the tape is altered by the system control circuit 1 (for example, increased N times,) a phase correction circuit 14 and a speed correction circuit 15 cause, respectively, the phase comparator circuit 6 and the speed comparator circuit 8 to have respective such new target values that the phase and speed of the rotary head drum match the new speed of transport of the tape.

Meanwhile, in a system for controlling the driving of a capstan for moving the tape, there are an electric motor 16 for driving the capstan, and an FG pulse generator 17 responsive to rotation of the motor 16 for driving the capstan for producing a pulse signal. This FG pulse produced by the FG pulse generator 17 is supplied through an amplifier 18 to a phase comparator circuit 19 where it is compared with a reference signal $ref_2$ (the output of a frequency divider 20) to produce a phase error signal. The frequency divider 20 divides the frequency of a standard signal output from an oscillator (not shown) to produce the reference signal $ref_2$ which is supplied to the phase comparator circuit 19. A frequency divider 21 capable of varying the frequency division ratio divides the frequency of the FG pulses output from the amplifier 18 by "N" based on the command from the system control circuit 1. The frequency-divided FG pulses output from the frequency divider 21 is subjected, for example, to F-V conversion by a speed comparator circuit 22 to produce a speed error signal. A detector circuit 23 detects, for example, the 4-frequency pilot signal for ATF (for Auto Tracking Finding) (or the control signal CTL) out of the reproduced signal and puts it to balanced modulation with a reference frequency to produce predetermined two beat signals. An ATF control circuit 24 performs a computation of the output signal of the detector circuit 23 to detect a tracking error of the head relative to the record track and produces an output representing an amount of correction. A switch $S_2$ interlocks with the switch $S_1$ to select the output of the phase comparator circuit 19 or the output of ATF control circuit 24 depending on the selected one of the recording and reproducing modes. An adder 25 adds the speed error signal output from the speed comparator circuit 22 and the selected one by the switch $S_2$ of the phase error signal output from the phase comparator circuit 19 and the tracking error signal output from the ATF control circuit 24. The composite error signal produced by the adder 25 is fed back through an amplifier 26 to a drive circuit 27 for the motor for driving the capstan. Thus, the speed and phase at which the capstan is driven is controlled. That is, during recording, the phase comparator circuit 19 is selected to connect with the adder 25 by the switch $S_2$. Hence, the motor 16 for driving the capstan is controlled by comparing its phase with the phase of the reference signal. During reproducing, the ATF control circuit 24 is selected to connect with the adder 25 by the switch $S_2$. Hence, the motor 16 for driving the capstan is controlled in accordance with the tracking error signal.

Now suppose such a VTR is set in normal reproducing mode, then the switches $S_1$ and $S_2$ take their PB positions.

In the rotary head drum control system, therefore, the composite error signal produced from outputs of the phase comparator circuit 6 and the speed comparator circuit 8 is used to control the rotation of the motor 2 for driving the rotary head drum. For this purpose, the phase comparator circuit 6 is supplied with the reference phase from the frequency divider 13. Also, the phase correction circuit 14 and the speed correction circuit 15 are given a control command from the system control circuit 1 so that the reference signal corresponding to the normal reproduction speed is supplied to the phase comparator circuit 6 and the speed comparator circuit 8.

In the capstan control system, the composite signal produced from the speed error signal output from the speed comparator circuit 22 and the tracking error signal output from the ATF control circuit 24 are used to control the rotation of the motor 16 for driving the capstan.

With this condition, when the reproduction mode is set to, for example, high speed or N times faster search, the system control circuit 1 supplies the frequency divider 21 with a command of changing its ratio of division of the frequency to 1/N. Thereupon, the speed comparator circuit 22 controls the speed at which the capstan is to rotate in feedback manner so as to cancel that change. Eventually, the speed of rotation of the capstan becomes N times as fast. Thus, the N times faster mode starts to operate.

Meanwhile, even the rotary head drum control system is supplied from the system control circuit 1 with a command for causing the phase correction circuit 14 and the speed correction circuit 15 to supply a reference signal representing the amount of correction of the phase and the amount of correction of the speed in correspondence to the N times faster rotation to the phase comparator circuit 6 and the speed comparator circuit 8. In such a way, the speed of rotation of the rotary head drum is N times increased.

Also, the outputs of the phase correction circuit 14 and the speed correction circuit 15 representing the amount of correction of the phase and the amount of correction of the speed respectively, if it is an analog servo circuit, takes the form of an increase or decrease of the constant voltage or current, or if it is a digital servo circuit, the form of a shifted frequency of the speed and phase reference signal by changing the ratio of division of the frequency in the reference oscillator.

However, according to the method described above, if the number of times the speed in the high speed search mode is faster than the normal recording or reproduction mode is as small as a few times, the time from its command until the tape transport speed reaches the value the command instructs and becomes stable, and the time until the speed of rotation of the rotary head drum locks in at the value the command instructs are both relatively short. Since the discrepancy between the speeds of the tape and the head is small, it does not cause large influence on the disorder of the horizontal synchronism of the television set or the monitor display.

However, to realize a high speed search of higher times, the ramp time from the moment at which the "N times search" command has been given to the moment at which the motor for driving the capstan and the motor for driving the drum actually lock in can no longer be ignored. Hence, the use of the above-described control method leads to a possibility of occurrence of disorder of the horizontal synchronizing, color disappearance, and a color deviation.

Also, even in the stationary state of the high speed search, it is necessary that the motor for driving the capstan is locked in always just at N times. Hence the servo system is required to have an extremely high precision accuracy of high speed control. This causes the control algorithm to change to a more complicated form and its cost to become rapidly higher.

It is to be noted that as the related art on the speed control of the rotary head drum or the like to be used in the present invention, mention may be made of those disclosed in U.S. Pat. No. 4,517,501 concerning the speed, phase servo of the rotary head drum and in U.S. patent application Ser. No. 369,011 filed on Jun. 15, 1989 where upon detection of when the rotary head drum has locked in phase, the reproduced synchronizing signal from the recording medium is used to establish synchronism.

SUMMARY OF THE INVENTION

The present invention has been made to eliminate the above-described problems and its first object is to provide a drive control device which controls a head in accordance with the transporting state of a recording medium, thereby it being made possible to always accurately synchronize the driving states of the head and the recording medium.

A second object of the invention is to provide a drive control device of good responsiveness which enables the driving state of a head to synchronize swiftly with the change of the speed of transportation of the recording medium.

A third object of the invention is to provide a drive control device which does not disorder synchronizing even in the period until the speed of transport of the recording medium reaches a target value.

Under such a situation, according to a preferred embodiment of the invention, a drive control device is disclosed which is provided with head drive means for driving a head, transport means for transporting a recording medium relative to the head, and correction means for detecting a change of the speed of transport of the recording medium and supplying correction information to the head drive means to correct the driving state of the head.

Another or fourth object of the invention is to provide a rotation control device which controls a rotary head drum in accordance with the transporting state of a recording medium, thereby it being made possible to always accurately synchronize the driving states of the rotary head and the recording medium and moreover not to disorder the synchronizing even in the period until the target value is reached.

Under such a situation, according to a preferred embodiment in the invention, a rotation control device is disclosed which is provided with drum driving means for driving a rotary head drum to rotate, tape transport means for driving a tape-shaped recording medium under such a condition that it is wound a predetermined angle around the rotary head drum, and control means for detecting a change of the speed of transport of the tape and controlling the head drive circuit so as to correct the speed of rotation of the rotary head drum.

Another or fifth object of the invention is to provide a reproducing apparatus having a plurality of modes with different speeds of transport of according medium wherein arrangement is made such that the target value for the speed of rotation of a rotary head drum is set on the basis of information representing the speed of transport of the tape detected from a capstan motor or like tape drive system, whereby after the speed of transport of the tape is altered as a high speed search mode is set in, its ramp or the period until the speed of transport of the tape becomes stable is prevented from suffering a disorder of the horizontal synchronizing in the television set or monitor so that deterioration of the image quality such as color deviation and color disappearance can be avoided, thus making it possible to relieve each response characteristic for the control of the capstan.

Another or sixth object of the invention is to provide a reproducing apparatus which enables the speed of transport of a tape to vary any number of times with stepless control when the search mode is operated, and which is applicable to any other modes such as still reproduction and slow reproduction modes where the running speed of the tape may take any value.

Other objects of the invention will become apparent from the following written specification and the drawings.

DETAILED DESCRIPTION OF THE PREFERRED EMBODIMENTS

Figure 2:
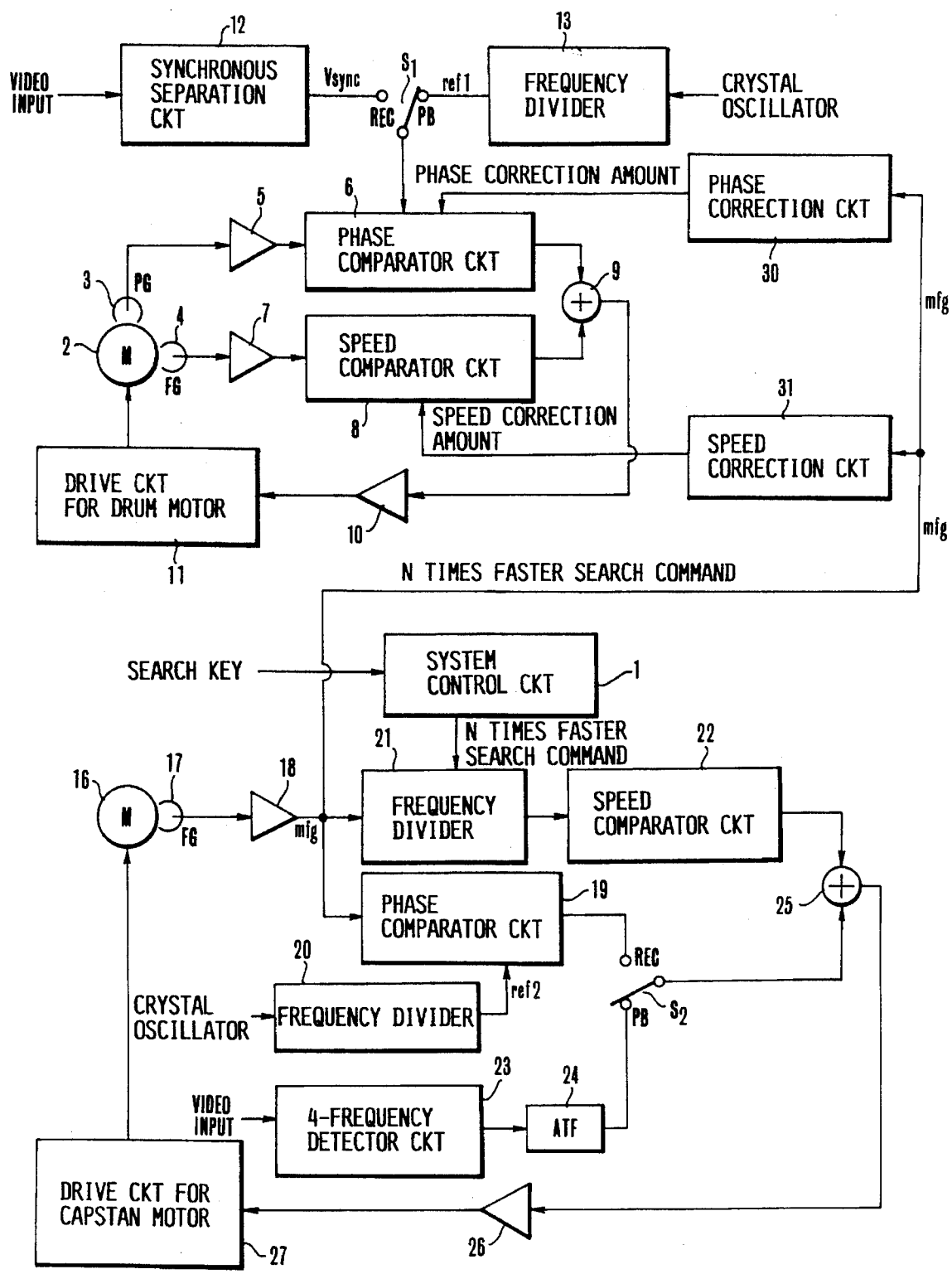
FIG. 2 is a block diagram of an embodiment of a rotation control device according to the invention.

FIG. 2 in block diagram shows an embodiment of the rotation control device according to the invention applied to the VTR.

Figure 1:
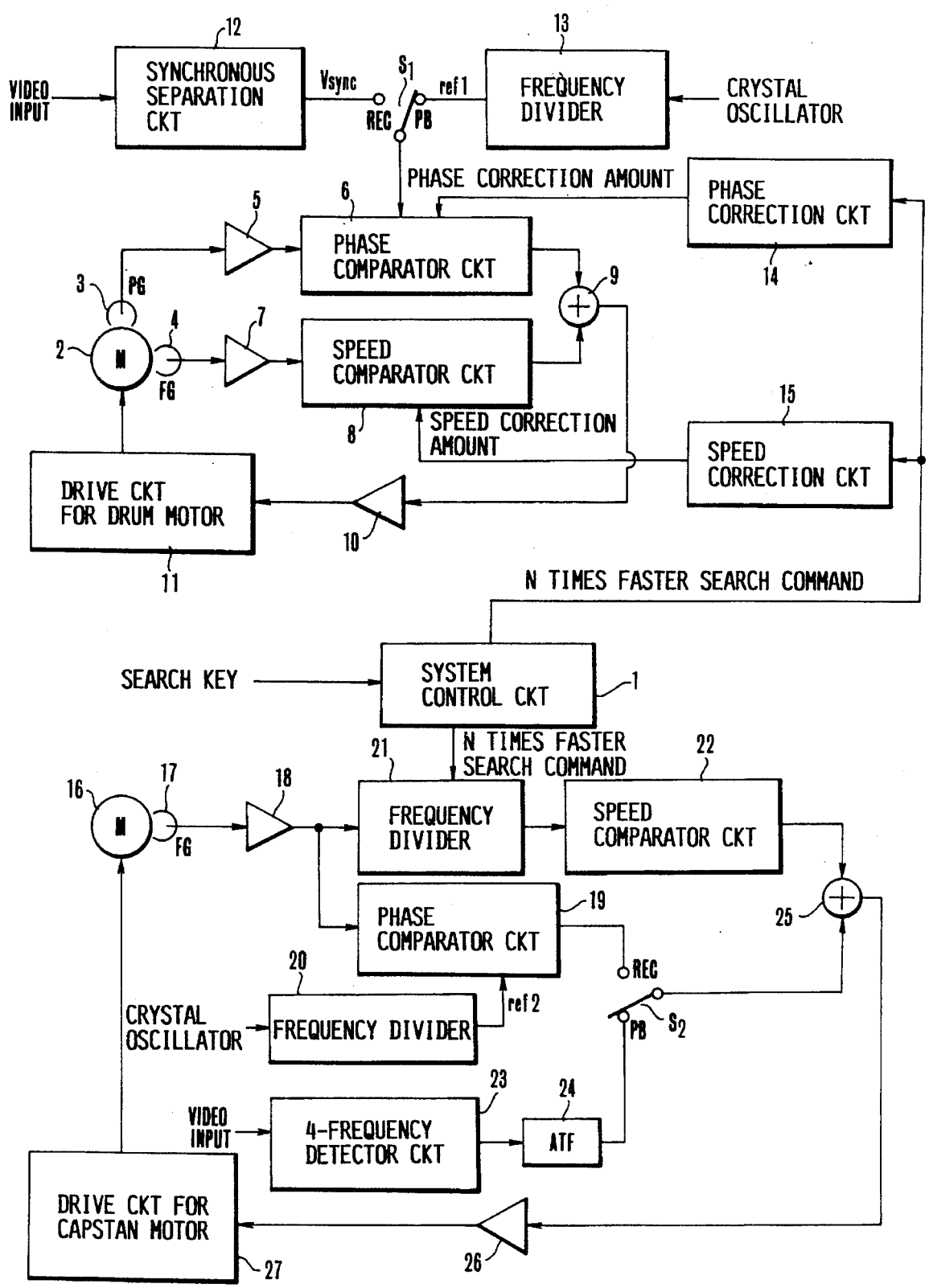
FIG. 1 is a block diagram of a general example of the rotation control device.

In the same figure, the parts which are similar in construction to those of the general drive control circuit shown in FIG. 1 are denoted by the same reference numerals, and their explanation is omitted.

In the present embodiment, the different features from those of FIG. 1 reside in the construction of circuits for correcting the speed and the phase in the rotary head drum control system, namely, a speed correction circuit 31 and a phase correction circuit 30 and a method of controlling the phase control circuit 30 and speed control circuit 31 in accordance with not the instruction value output from the system control circuit 1 but the state of rotation of the motor 16 for rotating the capstan, in other words, the frequency of the FG pulses output from the FG pulse generator 17. Thus, it is by the rotation of the capstan that the amounts of correction to be used in controlling the rotary head drum by the phase comparator circuit 6 and the speed comparator circuit 8 are made to be controlled.

By this, as an N times faster search mode is selected to operate, when a different speed of transport of the tape from the normal one is set in, the output (frequency "mfg") of the FG pulse generator 17 which detects the rotation of the motor 16 for driving the capstan, i.e., the output of the amplifier 18, is supplied as the control signal to the speed correction circuit 31 and the phase correction circuit 30, and, on the basis of this, the speed and phase of rotation of the rotary head drum are controlled.

That is, when the VTR is switched from the normal reproduction mode to an N times faster search mode by operating a high speed search key (not shown), the system control circuit 1 gives the frequency divider 21 an "N times faster search" command. Then, the frequency divider 21 produces an output having a frequency of 1/N of the frequency of the FG pulse "mfg" produced by the FG pulse generator 17. Responsive to this, the speed comparator circuit 22 controls the motor 16 for driving the capstan so that its speed becomes N times as fast in order that the FG pulses recovers its frequency from a value of mfg/N in which it has fallen to the initial value of "mfg" (the frequency of the FG pulses rises N times). Therefore, the speed of transport of the tape increases N times.

Meanwhile, the FG pulse "mfg" produced by the FG pulse generator 17 is supplied to the phase correction circuit 30 and the speed correction circuit 31 of the rotary head drum control system.

Figure 3A:
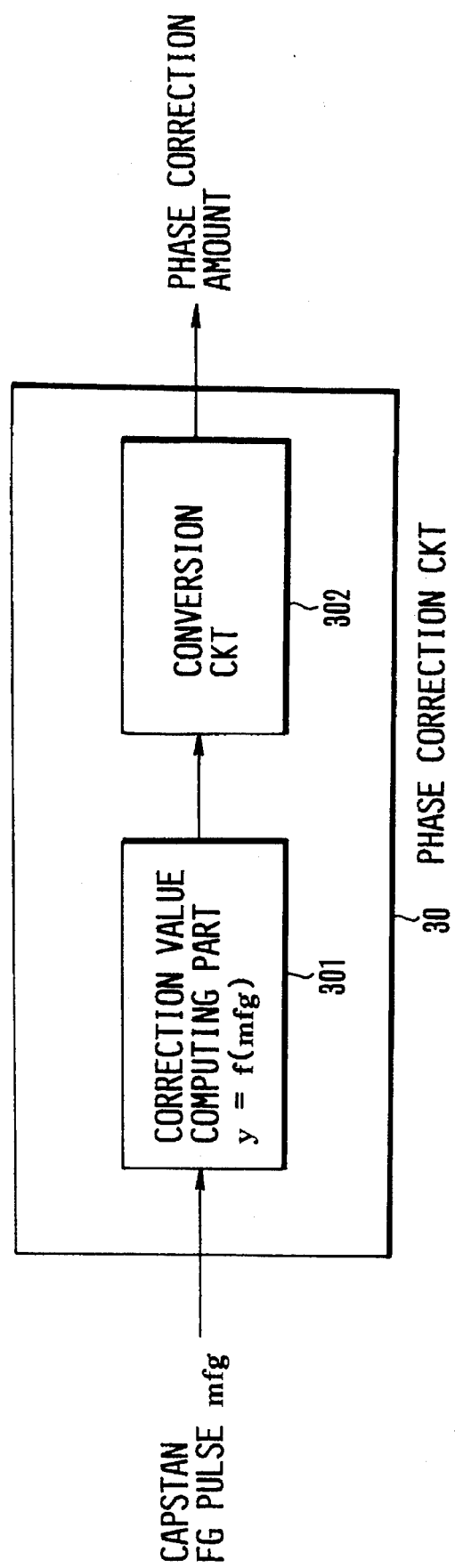
FIGS. 3(a) and 3(b) are block diagrams illustrating respectively the internal structures of the phase correction circuit and the speed correction circuit shown in FIG. 2.

The phase correction circuit 30 and the speed correction circuit 31 are basically similar in construction to each other. FIG. 3(a) shows the construction and arrangement of the internal parts of the phase correction circuit 30. The phase correction circuit 30 comprises a correction value computing part 301 for computing the correction value y=f(mfg) on the basis of the FG pulse "mfg" and a conversion circuit 302 for converting the correction value "y" output from the correction value computing part 301 to a form of, for example, phase error voltage, suited to be supplied to the phase comparator circuit 6.

Figure 3B:
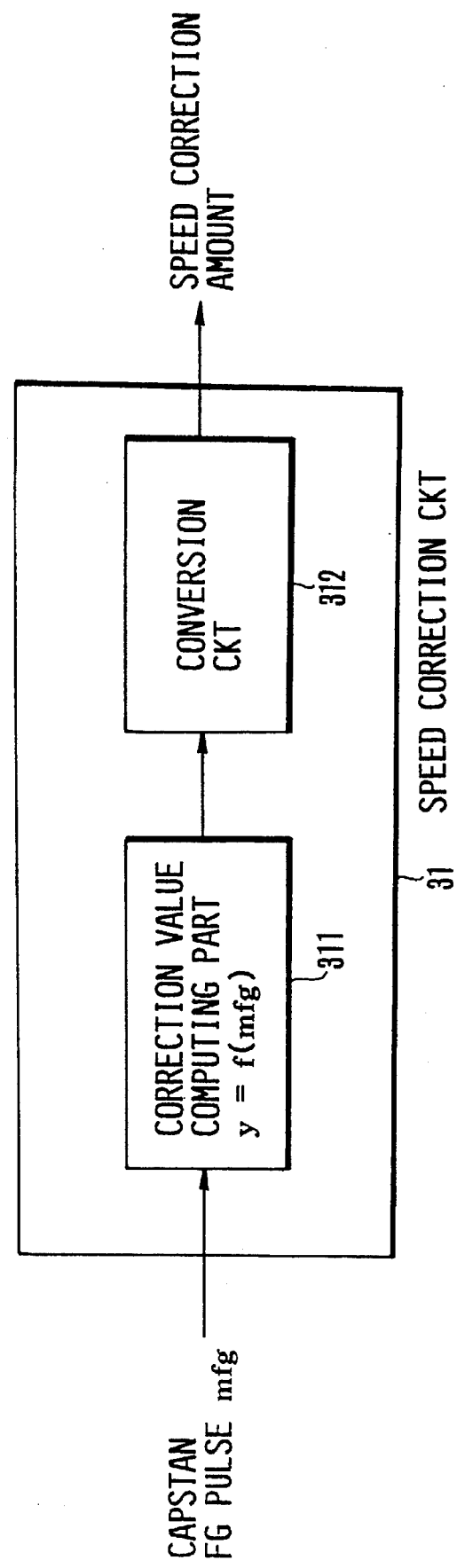

The speed correction circuit 31 also, likewise the phase correction circuit 30, comprises, as shown in FIG. 3(b), a correction value computing part 311 for computing the correction value y=f(mfg) on the basis of the FG pulse "mfg" and a conversion circuit 312 for converting the computed correction value "y" to a form suited to be supplied to the speed comparator circuit 8, thus being basically similar to the phase correction circuit 6.

In the correction circuit 30 or 31, at the correction value computing part 301 or 311, the speed $V_{ND}$ for N times as fast rotation of the rotation as in the normal recording or reproduction mode, that is, the correction value "y", is expressed from the relationship of the relative speed of the rotary head drum to the tape by a function of the number of times N in the search speed:

$$V_{ND} = V_D \cdot \frac{V}{V_N} = F(N) \qquad (1)$$

$$= V_D \cdot \sqrt{\frac{V_T^2 + V_D^2 - 2V_TV_D\cos\theta}{(NV_T)^2 + V_D^2 - 2NV_TV_D\cos\theta}}$$

where
V: the relative speed of the rotary head drum to the tape at one times as fast;
$V_N$: the relative speed of the rotary head drum to the tape at N times as fast;
$V_T$: the running speed of the tape (at one time as fast)
$V_D$: the speed of rotation of the rotary head drum (at one time as fast);
N: the number of times in search;
θ: the angle of the video track (tape stop);
$V_{ND}$: the speed of rotation of the rotary head drum at N times as fast.

The $V_{ND}$ is given by another expression of a function of arbitrary capstan FG frequency "mfg" as follows:

$$V_{ND} = F\left(\frac{mfg}{mfg1}\right) = f(mfg) \qquad (2)$$

$$= V_D \cdot \sqrt{\frac{V_T^2 + V_D^2 - 2V_TV_D\cos\theta}{\left(\frac{mfg}{mfg1} V_T\right)^2 + V_D^2 - 2\frac{mfg}{mfg1} V_TV_D\cos\theta}}$$

where mfg1 is the frequency of the FG pulses of the capstan at one time as fast. By carrying out computation based on this formula, the correction value $y=f(mfg)=V_{ND}$ is obtained.

Also, the conversion circuit 302 or 312 produces the obtained computation result "y" in the form of a constant current, a constant voltage, a ratio of division of the frequency, or other control amounts suited to the servo system. Which of these forms is selected depends on the circuit design of the phase comparator circuit and the speed comparator circuit.

Therefore, the present invention, unlike the prior known device in which the rotary head drum control system and the capstan control system are controlled in separation from each other based on the respective commands from the system control circuits, is able to immediately compute the change of the speed of the capstan independently of the commanded value of the system control circuit and supply it as the target value or correction value for the speed and phase of the rotary head drum control system. Hence, the response to the change of the rotational frequency of the capstan is very fast so that a linear phase, and speed value can always be obtained.

That is, concretely speaking, the correction of the phase and speed of the rotary head drum is made depending on the change of the speed of rotation of the capstan, or the driving speed of the tape. This obviates the problem that when a different or N times faster tape speed from the current tape speed is set, disordering the picture continues until both of the capstan drive system and the rotary head drum drive system become stable, because the system control circuit 1 gives the separate commands of N times as fast to these systems as in the prior art.

In this respect, according to the present invention, correction of the speed of rotation and the phase of rotation of the rotary head drum is made in conformance with the capstan drive system, that is, the transporting state of the tape. Therefore, both drive systems are in synchronism. Thus, the picture is not disordered and alteration of the mode can smoothly be carried out.

It should be noted that in the above-described embodiment, the value of the computation formula (2) of the correction value computing part 301(311) shown in FIG. 3(*a*) or 3(*b*) is not necessarily used as it is, but a curve the computation formula (2) depicts may be approximated, for example, in parts by lines. If so, the computation can be simplified and the computation speed can be increased.

Figure 4:
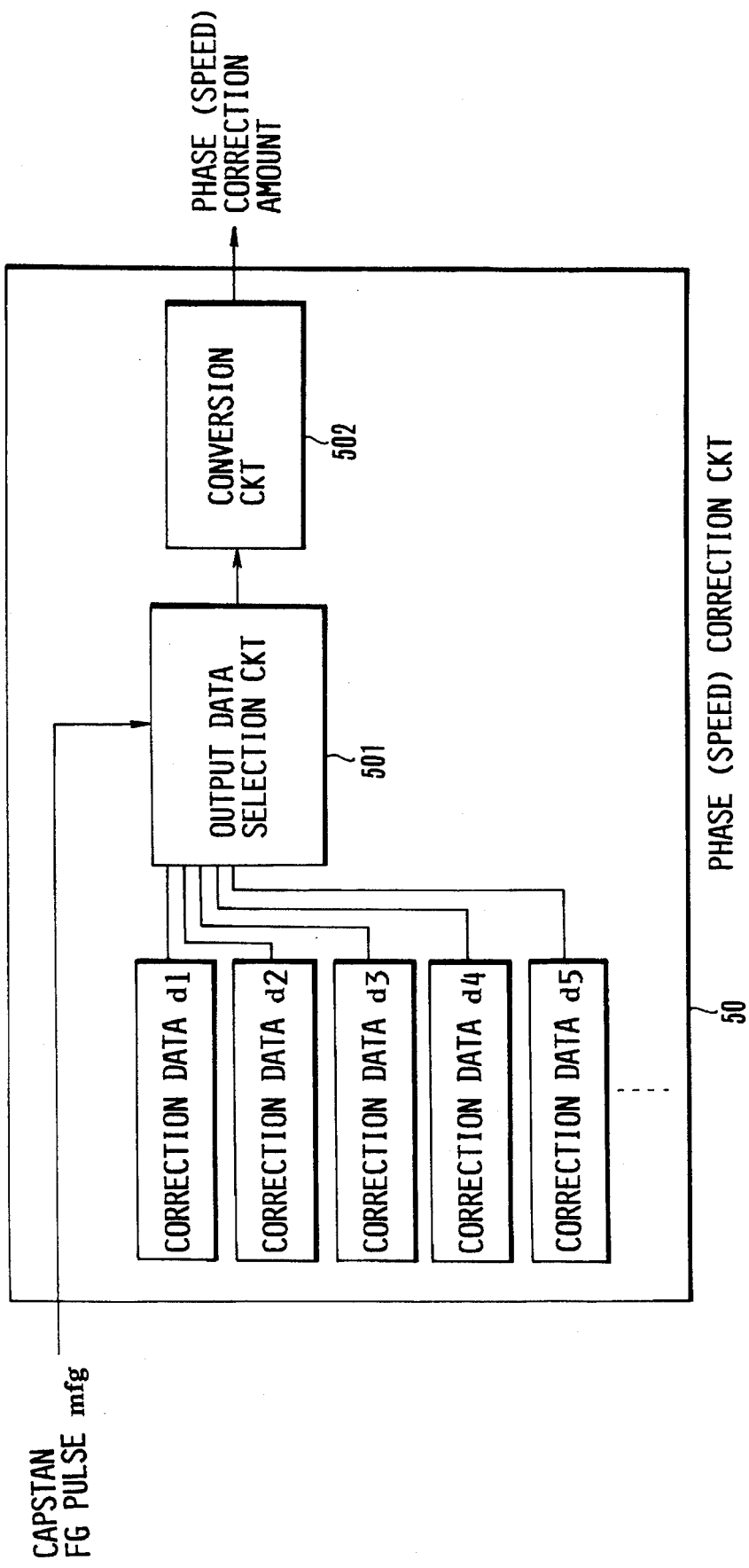
FIG. 4 is a block diagram of another example of the internal structure of the phase correction circuit or the speed correction circuit shown in FIG. 2.

FIG. 4 shows another practical example of the phase (speed) correction circuit in the invention. This correction value computing circuit 50 does not have a numerical computation processor like the correction computing part 301 or 311 of the phase speed correction circuit 30 or 31, but stores a plurality of fixed correction data. Depending on the value of the frequency "mfg" of the inputted FG pulses, an optimum one of these correction data $d_1, d_2, d_3, \ldots$ is selected and produced at the output. This selection is changed stepwise in sequence depending on the value of "mfg" by an output data selection circuit 501. Subsequently, by a conversion circuit 502, the correction amount is converted into a form suited to the corrected target.

Figure 5:
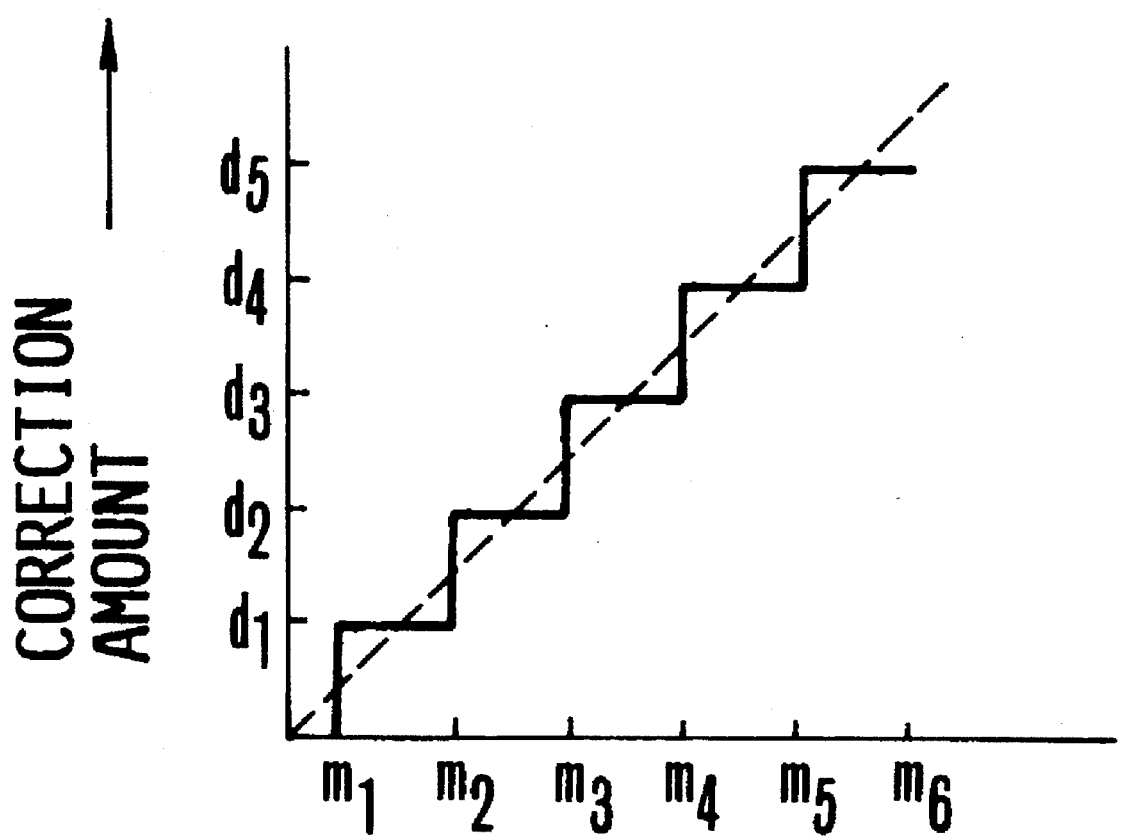
FIG. 5 is a graph illustrating the correction characteristic by the correction circuit of FIG. 4.

The correction amount relative to the input FG pulse mfg takes discrete values as shown in FIG. 5. The narrower the resolving power (the intervals $m_1, m_2, m_3, \ldots$ of FIG. 5), the finer the control can become. But, the acceptable maximum value of the resolving power must be such that a disorder of the horizontal synchronizing, a color deviation, etc., in the television set or monitor does not occur at the value "mfg" near the boundary across which the correction amount changes.

As has been described above, according to the present invention, arrangement is made such that as a plurality of modes with different speeds of transport of the tape are selectively operated, the target value the speed of rotation of the rotary head drum is to take is set on the basis of the information representing the detected value of the speed of transport of the tape by the capstan motor or the like tape drive system. Hence if, as the high speed search mode or the like is selected to operate, the speed of transport of the tape is altered, it is in its ramp or the period until the speed of transport of the tape becomes stable that the horizontal synchronizing of the television set or monitor is prevented from disordering, and deterioration of the picture quality due to the color deviation, color disappearance, etc., can be avoided. This relieves each response characteristic to the control of the capstan. It is also made possible to perform searching at continuously changing speeds. Also, when changing a constant (for example, "N" etc.) in the above formula (1) or (2), the invention is applicable not only to the high times faster search but also the still reproduction, slow reproduction and other modes where the speed of transport of the tape can take any value without any further alteration while permitting equivalent results to be effected. The invention has thus produced such many advantages.

What is claimed is:

1. A drive control device comprising:

(A) head drive means for rotating head means;

(B) recording medium transport means for transporting a recording medium relative to said head means;

(C) instructing means for instructing a transport speed of said recording medium only to said recording medium transport means;

(D) detecting means for detecting a change of a speed and/or phase of transport of said recording medium and outputting detection information corresponding to said change; and (E) correcting means for correcting a speed and/or phase of rotation of said head means by controlling said head drive means on the basis of said detection information.

2. A device according to claim 1, wherein said head means is a rotary head drum having a head mounted on an outer periphery thereof, and wherein said head drive means is a means for driving rotation of said rotary head drum.

3. A device according to claim 2, wherein said head drive means includes speed servo means for keeping constant a speed of rotation of said rotary head drum and phase servo means for keeping constant a phase of rotation of said rotary head drum.

4. A device according to claim 3, wherein said recording medium is a tape-shaped recording medium, and wherein said recording medium transport means transports said tape-shaped recording medium relative to said head means and is able to selectively set a plurality of speeds of transport.

5. A device according to claim 4, wherein said recording medium transport means includes speed servo means for keeping constant a speed of said tape-shaped recording medium and phase servo means for keeping constant a phase 6. A device according to claim 1 or 5, wherein said detecting means includes speed detecting means for detecting a change of a speed of transport of said recording medium and phase detecting means for detecting a driven phase of said recording medium, whereby a correction signal according to the change of the speed of transport of said recording medium is supplied to said head drive means so that the driving state of said head means is synchronized with the driving state of said recording medium.

7. A device according to claim 6, wherein said detecting means detects a speed and/or phase of transport of said recording medium, and said correcting means continuously controls the driving state of said head means.

8. A device according to claim 6, wherein said correction means has memory means storing a plurality of correction values corresponding to speeds and/or phases of transport of said recording medium, whereby the speed and/or phase of transport of said recording medium is detected by said detecting means and the detection information corresponding to the speed and/or phase of transport is supplied to said head drive means from said detecting means.

9. A device according to claim 6, wherein said recording medium transport means is a capstan drive means for driving a capstan to transport said recording medium at a constant speed.

10. A device according to claim 9, wherein said correction means compute correction signals corresponding to changes of the speed and phase on the basis of FG pulses produced by said detecting means according to rotation of said capstan.

11. A device according to claim 1, further comprising a system control circuit for selectively setting a plurality of operational modes, wherein said instructing means instructs a speed of transport of said recording medium in accordance with the selected operational mode.

12. A device according to claim 11, wherein said plurality of operational modes include modes for setting at least normal recording, reproduction, high speed search, slow reproduction and still reproduction.

13. A rotary head drum control device comprising:
  (A) drum drive means for driving rotation of a rotary head drum;
  (B) tape transport means for driving a tape-shaped recording medium in such a condition that said recording medium is wound a predetermined angle around said rotary head drum;
  (C) instructing means for instructing a transport speed of said recording medium only to said tape transport means;
  (D) detection means for detecting a change of a speed of transport of said recording medium by said tape transport means and outputting detecting information corresponding to said change; and
  (E) control means for controlling said drum drive means to correct a speed of rotation of said head drum on the basis of said detecting information.

14. A device according to claim 13, wherein said drum drive means includes speed servo means for keeping constant a speed of rotation of said rotary head drum and phase servo means for keeping constant a phase of rotation of said rotary head drum.

15. A device according to claim 14, wherein said tape transport means includes speed servo means for keeping constant a speed of said tape-shaped recording medium and phase servo means for keeping constant a phase with a reference signal output from a reference signal oscillator.

16. A device according to claim 13 or 15, wherein said detection means includes speed detecting means for detecting a change of a speed of transport of said tape-shaped recording medium and phase detecting means for detecting a phase of said recording medium driven by said tape transport means, and said control means computes a detection information corresponding to a change of the speed and phase of transportation of said tape-shaped recording medium and supplies said detection information to said drum drive means so that the driving state of said drum is synchronized with the driving state of said tape-shaped recording medium.

17. A device according to claim 16, wherein said recording medium transport means is a capstan drive means for driving a capstan to transport said recording medium at a constant speed.

18. A device according to claim 17, wherein said control means computes correction signals corresponding to changes of the speed and the phase on the basis of FG pulses produced by said detection means according to rotation of said capstan.

19. A device according to claim 17, wherein said detection means detects a transporting state of said tape-shaped recording medium, and said control means continuously control a driving state of said drum drive means.

20. A device according to claim 19, wherein said control means has memory means storing a plurality of said detection information corresponding to transporting states of said recording medium, whereby the transporting state of said recording medium is detected by said detection means and the detection information corresponding to that transporting state is supplied to said drum drive means from said detection means.

21. A device according to claim 13, further comprising a system control circuit for selectively setting a plurality of operational modes, wherein said instructing means instructs a speed of transport of said recording medium in accordance with the selected operational mode.

22. A device according to claim 21, wherein said plurality of operational modes include modes for setting at least normal recording, reproduction, high speed search, slow reproduction and still reproduction.

23. A video tape recorder comprising:
  (A) drum drive means for driving rotation of a rotary head drum having a recording or reproducing head, mounted on an outer periphery thereof;
  (B) tape transport means for driving a tape-shaped recording medium in such a condition that said recording medium is wound a predetermined angle around said rotary head drum;
  (C) selecting means for selecting a predetermined mode of a plurality of operational modes;
  (D) system control means for setting the operational mode on the basis of the selected operational mode and only controlling said tape transport means in accordance with each selected operational mode, to vary a speed of transport of said tape-shaped recording medium;
  (E) detecting means for detecting a change of a speed of transport of said tape-shaped recording medium and outputting detection information corresponding to said change; and
  (F) correcting means for computing a correction signal for correcting a rotating state of said rotary head drum according to said detection information and supplying said correction signal to said drum drive means.

24. A recorder according to claim 23, wherein said drum drive means includes speed servo means for keeping constant a speed of rotation of said rotary head drum and phase servo means for keeping constant a phase of rotation of said rotary head drum.

25. A recorder according to claim 24, wherein said tape transport means includes speed servo means for keeping constant a speed of rotation of said tape-shaped recording medium and phase servo means for keeping constant a phase with a reference signal output from a reference signal oscillator.

26. A recorder according to claim 23 or 25 wherein said detection means includes speed detecting means for detecting a change of a speed of transport of said tape-shaped recording medium and phase detecting means for detecting a driven phase of said recording medium, and said control means computes the correction signal corresponding to the change of the speed of transport of said tape-shaped recording medium and supplies said signal to said drum drive means so that the driving state of said drum is synchronized with the driving state of said tape-shaped recording medium.

27. A recorder according to claim 26, wherein said recording medium transport means is a capstan drive means for driving a capstan to transport said recording medium at a constant speed.

28. A recorder according to claim 27, wherein said detection means detects a transporting state of said tape-shaped recording medium, and said control means continuously controls a driving state of said drum drive means.

29. A recorder according to claim 28, wherein said control means has memory means storing a plurality of said detected information corresponding to the transporting states of said tape-shaped recording medium, whereby the transporting state of said recording medium is detected and the correction signal corresponding to that transporting state is supplied to said drum drive means.

30. A recorder according to claim 23, wherein said plurality of operational modes include modes for setting at least normal recording, reproduction, high speed search, slow reproduction and still reproduction.

\* \* \* \* \*